No. 749,913. Patented January 19, 1904.

UNITED STATES PATENT OFFICE.

OSCAR BALLY, OF MANNHEIM, GERMANY, ASSIGNOR TO BADISCHE ANILIN UND SODA FABRIK, OF LUDWIGSHAFEN-ON-THE-RHINE, GERMANY, A CORPORATION OF GERMANY.

ANTHRAQUINONE DYE AND PROCESS OF MAKING SAME.

SPECIFICATION forming part of Letters Patent No. 749,913, dated January 19, 1904.

Application filed July 24, 1902. Serial No. 116,858. (Specimens.)

*To all whom it may concern:*

Be it known that I, OSCAR BALLY, doctor of philosophy and chemist, a citizen of the Swiss Republic, residing at Mannheim, in the Grand Duchy of Baden, in the Empire of Germany, have invented new and useful Improvements in Anthraquinone Dyes and Processes of Making Same, of which the following is a specification.

I have discovered that when sulfo-acids of aromatic amins are under suitable conditions condensed with hydroxy-anthraquinone bodies new coloring-matters are formed which are directly soluble in water and which dye unmordanted wool and mordanted wool valuable shades. By "hydroxy-anthraquinone" bodies I understand, in addition to hydroxy-anthraquinones themselves, such derivatives thereof as contain halogen. The said condensation may be advantageously carried out in the presence of water by heating the reacting bodies at a sufficiently high temperature.

The following examples will serve to further illustrate the nature of my invention; but the invention is not confined to these examples nor to the particular conditions described therein. The parts are by weight.

Example 1: Heat in an enameled autoclave for six (6) hours at one hundred and ninety-five to two hundred degrees centigrade (195°–200° C.) forty (40) parts of a purpurin paste containing twenty per cent. of purpurin, twenty (20) parts of water, and as much sulfanilic-acid sodium salt as corresponds to twelve and three-fourths (12¾) parts of free sulfanilic acid. When cold, collect by filtration the reaction product, which separates out as a brownish paste. Should it have separated out in too large crystals, dissolve it when dry in cold concentrated sulfuric acid and pour this solution into water. The reaction product then separates out in a finely-divided form. The coloring-matter so obtained is difficultly soluble in cold water and fairly easily soluble in hot water. It dyes unmordanted wool red and chrome mordanted wool blue-violet to blue-black.

Example 2: Mix twenty (20) parts of chinizarin, one hundred (100) parts of water, and the sulfanilic-acid sodium salt obtained from thirty-four (34) parts of sulfanilic acid. Heat this mixture in an autoclave for six (6) hours at one hundred and ninety degrees centigrade (190° C.). When cold, collect the coloring-matter that separates out, dissolve it in hot water, filter from any insoluble matter, and salt it out from the filtrate by means of common salt. The coloring-matter so obtained is easily soluble in water and dyes chrome mordanted wool violet.

Example 3: Well mix one hundred (100) parts of a paste of alizarin bordeaux (chinalizarin) containing twenty (20) per cent. of coloring-matter, twenty (20) parts of boric acid, and the sulfanilic-acid sodium salt obtained from thirty-four (34) parts of free sulfanilic acid. Heat the mixture in an autoclave for six (6) hours at two hundred degrees centigrade (200° C.). Isolate the reaction product. In the paste form as obtained by dissolving it in concentrated sulfuric acid and pouring this solution into water it dyes chrome mordanted wool blue to blue-black.

Example 4: Heat in an autoclave twenty-five (25) parts of brompurpurin, forty (40) parts of sulfanilic-acid sodium salt containing eighty-five (85) per cent. of the salt, and one hundred (100) parts of water at a temperature of two hundred degrees centigrade (200° C.) until practically no more unaltered brompurpurin remains. When cold, collect by filtration the coloring-matter which separates out, wash it with a solution of common salt, and dry it. It is preferably brought into paste form by dissolving it in concentrated sulfuric acid and precipitating it with water. It then dyes chrome mordanted wool violet to violet-black shades. The brompurpurin employed in this example can be obtained, for instance, by adding to a solution or suspension of purpurin in boiling glacial acetic acid sufficient bromin to form mono-brom-purpurin.

Example 5: Heat in an autoclave twelve (12) parts of chlorpurpurin and twenty-five (25) parts of sulfanilic-acid sodium salt containing eighty-five (85) per cent. of the salt with fifty (50) parts of water at a temperature of two hundred degrees centigrade (200° C.). Proceed further as described in the foregoing Example 4. The chlorpurpurin employed in this example can be obtained, for instance, by suspending purpurin in hydrochloric-acid solution and adding sufficient powdered potassium chlorate to form mono-chlor-purpurin.

Example 6: Heat fifteen (15) parts of chloralizarin (see the German Patent No. 77,179) and thirty (30) parts of sulfanilic-acid sodium salt containing eighty-five (85) per cent. of the salt at a temperature of one hundred and eighty degrees centigrade (180° C.). Work up the coloring-matter formed as hereinbefore explained.

Example 7: Heat fifteen (15) parts of monobrom-chinizarin, fifteen (15) parts of boracic acid, thirty (30) parts of sulfanilic-acid sodium salt containing eighty-five (85) per cent. of the salt, and seventy (70) parts of water at two hundred degrees centigrade (200° C.) until the formation of coloring-matter is complete. Work up the coloring-matter so obtained as hereinbefore described.

In all the foregoing examples other sulfoacids of aromatic amines can be employed in place of sulfanilic acid.

The following table shows some of the properties of some of the coloring-matters obtainable by my new process:

| | Color of the solution in— | | | | | | Dyes chrome mordanted wool. |
|---|---|---|---|---|---|---|---|
| | Water. | Water with addition of sodium carbonate. | Water with addition of caustic soda. | Concentrated sulfuric acid. | Concentrated sulfuric acid and boric acid. | Anilin. | |
| Purpurin and sulfanilic-acid sodium salt. | Red | Violet-red | Violet-blue | Red-violet | Dull blue | Fuchsin-red. | Blue to violet blue-black. |
| Brompurpurin and sulfanilic-acid sodium salt. | Red | Fuchsin-red. | Violet | Red-violet | Blue | Fuchsin-red. | Violet to violet-black. |
| Brompurpurin and metanilic-acid sodium salt. | Red | Bluish red | Violet | Fuchsin-red. | Blue-violet | Wine-red | Violet to violet-black. |
| Brompurpurin and paratoluidin sulfo-acid sodium salt. | Red | Bluish red | Violet | Fuchsin-red. | Violet | Fuchsin-red. | Violet to violet-black. |
| Chlorpurpurin and sulfanilic-acid sodium salt. | Red | Fuchsin-red. | Violet | Red-violet | Blue | Fuchsin-red. | Violet to violet-black. |
| Chinizarin and sulfanilic-acid sodium salt. | Violet | Blue-violet | Blue | Violet | Violet-blue | Cherry-red | Violet to violet-black. |
| Bromchinizarin and sulfanilic-acid sodium salt. | Violet-red | Violet-red | Blue-violet | Violet-red | Violet | Dull violet-red. | Violet-blue to blue-black. |
| Alizarin bordeaux (chinalizarin) and sulfanilic-acid sodium salt. | Violet | Violet-blue | Blue | Blue | Green-blue | Violet | Blue to blue-black. |
| Chloralizarin and sulfanilic-acid sodium salt. | Brown-red | Red-violet | Violet | Brown-red | Violet | Brown-red | Dull violet to violet-black. |

I claim—

1. The process of manufacturing coloring-matter of the anthracene series by condensing a hereinbefore-defined hydroxy-anthraquinone substance with a sulfo-acid of an aromatic amin.

2. The process of manufacturing coloring-matter of the anthracene series by condensing purpurin with sulfanilic acid.

3. As new products the coloring-matters which can be obtained from a hereinbefore-defined hydroxy-anthraquinone substance and a sulfonated aromatic amido body, which dye chrome mordanted wool blue-black to violet-black, whose solution in water, or in anilin, is reddish to violet, whose aqueous solution on the addition of caustic soda becomes bluer, whose solution in concentrated sulfuric acid is red to violet, which solution on the addition of boric acid becomes blue to violet.

4. As a new product the coloring-matter which can be obtained by condensing purpurin with sulfanilic acid, which dyes chrome mordanted wool blue-violet to blue-black, whose solution in water or anilin is red, whose aqueous solution on the addition of caustic soda becomes violet-blue, whose solution in concentrated sulfuric acid is red-violet, which solution on the addition of boric acid becomes dull blue.

In testimony whereof I have hereunto set my hand in the presence of two subscribing witnesses.

OSCAR BALLY.

Witnesses:
JOHN L. HEINKE,
JACOB ADRIAN.